Patented Jan. 5, 1932

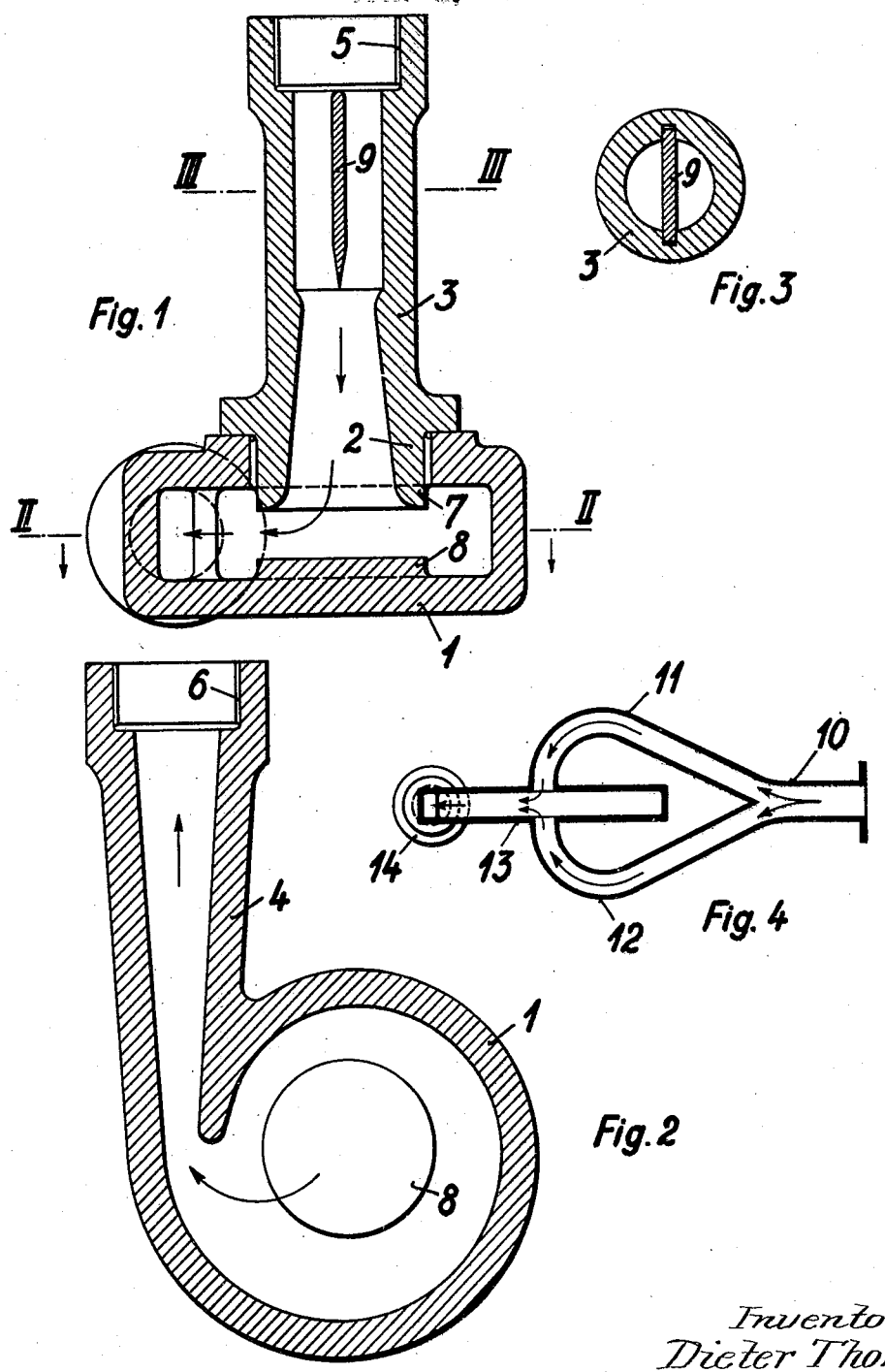

1,839,616

UNITED STATES PATENT OFFICE

DIETER THOMA, OF MUNICH, GERMANY

FLUID LINES

Application filed May 24, 1929, Serial No. 365,753, and in Germany June 11, 1928.

The invention relates to fluid lines for conducting gaseous or liquid fluid and has for its object to establish a practically unidirectional flow in such a line in a very simple and efficient manner without using any movable parts.

Check valves built into a line permit a flow in only one direction, but these mechanisms share the disadvantage incidental to moving parts—liability of becoming clogged, damaged or partly destroyed by the fluid passing through—and are therefore apt to come out of order.

There is also the danger of a hammering action, the sudden closure causing frequently an undue increase of pressure in the line. In some cases especially when conducting a fluid of light weight under a small head—gases— it proves quite a difficult problem to provide a check valve working satisfactorily at all.

According to my invention I impose a great resistance to a flow in one direction while the flow in the opposite direction is practically not restricted. For this purpose I provide a direct path for the fluid flowing in one direction and conduct the fluid through a circular or partly circular course when flowing in the opposite direction. I furthermore arrange the intake closer to the center of this circular path than the outlet and locate the latter preferably tangential to the circular course. The ratio of resistance in one direction to the resistance in the opposite direction may be varied in wide limits according to requirements.

The above and various other improvements will be hereinafter fully described and claimed. In order that this my invention may be more readily understood reference is made to the accompanying sheet of drawings which show how the invention may be carried into practical effect.

Fig. 1 shows a device according to my invention in section.

Fig. 2 is a section taken on line II—II of Figure 1.

Fig. 3 is a section taken on line III—III of Figure 1.

Fig. 4 is a modification in diagrammatic form of the device shown in the Figures 1 and 2.

The normal direction of flow is indicated by arrows on the drawings. A housing 1 of approximately circular or spiral cross section is provided with a threaded opening 2 into which the inlet 3 is screwed. A tangential outlet 4 is part of the housing. The outlet 4 is preferably made with a gradually increasing cross section. The inlet 3 is also provided with a cross section gradually increasing in the direction of the flow. The ends of the inlet and outlet are threaded at 5 and 6 for building the device conveniently into a fluid line.

With a device dimensioned aproximately in scale to the Figures 1 and 2 the resistance against fluid passing through in the direction of the arrows is less than the resistance offered by an ordinary check valve while fluid passing through in the opposite direction finds a vastly (in the present case about 35 times) greater resistance. This is due to the circular whirl being formed by the fluid when passing through in a direction opposite to the arrows the resulting centrifugal forces causing a considerable difference of pressure in the two connections 3 and 4. In order to facilitate the forming of a whirl a ring shaped projection 7 of the inlet 3 and a circular shoulder 8 of the housing 1 protrude from opposite sides into the chamber giving the latter the shape of an annular ring with the outlet branching tangentially therefrom. The velocity of the fluid in the whirl is influenced by the tangenital connection 4 being formed as a nozzle.

In order to prevent a turbulent flow of the fluid when streaming in a direction opposite to the arrows on the drawings there is provided a stabilizing plate 9 placed in grooves of the central connection 3 (see Fig. 3).

The arrangement shown diagrammatically in Figure 4 provides an inlet 10 branching into two lines 11 and 12 entering axially from opposite sides into the housing 13. This housing 13 and the outlet 14 may be the same as the housing 1 and the outlet 4 described before. This arrangement permits the use of a smaller size of inlet whereby the resistance against a flow in a direction opposite to the arrows may be greatly increased.

It is furthermore immaterial whether a single or a plurality of outlets are employed. Having now fully explained my invention I do not wish to be understood as limiting myself to the exact details of construction nor to the particular applications shown, as obviously many modifications will occur to a person skilled in the art.

What I claim is:

1. A device for resisting reverse flow in fluid lines, comprising a housing containing a chamber of approximately circular shape, said chamber being free from vanes and substantially unobstructed, an inlet close to the center of said chamber, an outlet approximately tangential to said chamber, so that fluid flowing in through said inlet may flow directly and with low resistance to and through said outlet and so that fluid flowing in through said outlet in a reverse direction will rotate in said chamber and encounter substantial resistance to such reverse flow, and guiding means built into said inlet for preventing a turbulent movement of the fluid in case of a flow opposite to the normal direction.

2. A device for resisting reverse flow in fluid lines, comprising walls forming a chamber having a thicker annular portion and a thinner central portion, said chamber being free from vanes and substantially unobstructed, an inlet connection leading to said central portion, and an outlet connection leading in a generally tangential direction from said annular portion, so that fluid entering said chamber from said inlet connection may flow substantially directly and with relatively low resistance to said outlet connection and so that fluid entering from said outlet connection will be caused to whirl in said chamber and may flow to said inlet connection only with relatively high resistance.

3. The method of retarding reverse flow which comprises interposing a chamber in a fluid line, causing fluid flowing in one direction in said line to flow substantially directly and unimpededly through said chamber, and causing fluid flowing in the opposite direction to whirl in said chamber with substantial rotary movement to impede reverse flow to a substantial extent.

4. The method of retarding reverse flow which comprises interposing in a fluid line a rounded chamber, introducing fluid flowing in one direction in the fluid line into the chamber substantially centrally thereof, and causing the introduced fluid to flow substantially directly and unimpededly through said chamber to substantially tangential outlet and thence to the fluid line, so that if fluid attempts to flow in said line in a reverse direction it will enter said chamber by said tangential outlet and will be caused thereby to rotate in said chamber to produce substantial impediment to such reverse flow.

In testimony whereof I hereunto affix my signature.

DIETER THOMA.